United States Patent [19]

Apté et al.

[11] Patent Number: 5,010,220
[45] Date of Patent: Apr. 23, 1991

[54] PROCESS AND APPARATUS FOR HEATING BODIES AT HIGH TEMPERATURE AND PRESSURE UTILIZING MICROWAVE ENERGY

[75] Inventors: Prasad S. Apté, Kingston; Aniket Pant, Inverary, both of Canada

[73] Assignee: Alcan International Limited, Montreal, Canada

[21] Appl. No.: 576,164
[22] Filed: Aug. 30, 1990

Related U.S. Application Data

[63] Continuation of Ser. No. 308,834, Feb. 9, 1989, abandoned.

[30] Foreign Application Priority Data

Feb. 16, 1988 [CA] Canada .................................. 558986

[51] Int. Cl.$^5$ ............................................. H05B 6/80
[52] U.S. Cl. ........................ 219/10.55 M; 219/10.55 R; 264/26; 425/174.8 E; 419/49
[58] Field of Search ................ 219/10.55 R, 10.55 M, 219/10.55 A, 10.55 E, 10.55 F; 264/25, 26; 425/174.4, 174.8 R, 174.8 E; 419/48, 49

[56] References Cited

U.S. PATENT DOCUMENTS

| | | | |
|---|---|---|---|
| 2,622,187 | 12/1952 | Welch | 219/10.55 E |
| 3,335,253 | 8/1967 | Jeppson et al. | 219/10.55 A |
| 3,398,251 | 8/1968 | Jeppson et al. | 219/10.55 A |
| 3,469,053 | 9/1969 | Levinson | 219/10.55 M |
| 3,494,724 | 2/1970 | Gray | 219/10.55 A |
| 3,585,258 | 6/1971 | Levinson | 219/10.55 R |
| 3,889,009 | 6/1975 | Lipoma | 219/10.55 A |
| 4,054,672 | 10/1977 | Inoue et al. | 426/234 |
| 4,123,230 | 10/1978 | Kirkbride | |
| 4,147,911 | 4/1979 | Nishitani | 219/10.55 M |
| 4,148,614 | 4/1979 | Kirkbride | |
| 4,219,361 | 8/1980 | Sutton et al. | 219/10.41 |
| 4,307,277 | 12/1981 | Maeda et al. | 219/10.55 R |
| 4,406,860 | 9/1983 | Beauvais et al. | 219/10.55 E |
| 4,406,861 | 9/1983 | Beauvais et al. | 219/10.55 E |
| 4,409,454 | 10/1983 | Beauvais et al. | 219/10.55 A |
| 4,412,865 | 11/1983 | Schmidt | 219/10.55 M |
| 4,490,597 | 12/1984 | Mengel | 219/10.55 E |
| 4,559,429 | 12/1985 | Holcombe | 219/10.55 M |
| 4,772,770 | 9/1988 | Matsui et al. | 219/10.55 A |
| 4,775,770 | 10/1988 | Fritz | 219/10.55 F |
| 4,938,673 | 7/1990 | Adrian | 419/49 |

FOREIGN PATENT DOCUMENTS

| | | |
|---|---|---|
| 902418 | 6/1972 | Canada . |
| 37643 | 10/1981 | European Pat. Off. ..... 219/10.55 A |
| 0308593 | 3/1989 | European Pat. Off. . |
| 2081560 | 2/1982 | United Kingdom . |

OTHER PUBLICATIONS

Kimrey, et al., "Techniques for Ceramic Sintering Using Microwave Energy", IEEE Conference Digest, 12th International Conference on Infrared and Millimeter Waves, Orlando, Fla., Dec. 14-18, 1987, pp. 136-137.

Materials Research Society Symposium Proceedings, vol. 124, 1988, pp. 213-218, Tian et al., "Microwave Sintering of $Al_2O_3$—TiC Composites".

Ceramic Engineering and Science Proceedings, vol. 8, Nos. 7-8, 1987, pp. 861-871, Meek et al.-"Microwave Sintering of $Al_2O_3$ and $Al_2O_3$—SiC Whisker".

Ceramic Transactions—vol. 1, pp. 933-938, 1987, Tian et al.—"Microwave Sintering of $Al_2O_3$—TiC Composites".

Tian et al.—"Ultrafine Microstructure of $Al_2O_3$ Produced by Microwave Sintering"—pp. 925-932—1987.

60-221367-A Japanese Published Patent Application—Abstract only, Nippon Microwave KK, 11-85.

Primary Examiner—Philip H. Leung
Attorney, Agent, or Firm—Cooper & Dunham

[57] ABSTRACT

A process and apparatus for heating bodies to high temperatures at high pressures. The process involves locating the body in a chamber capable of acting as a resonant cavity for microwave radiation of a predetermined frequency. The body is then irradiated in the cavity with microwave energy of the predetermined frequency for a time sufficient to raise the temperature of the body to a suitable high temperature. Then, either subsequently or simultaneously, a fluid at high pressure is introduced into the cavity to pressurize the body. The apparatus provides the equipment necessary for the operation of the process. The process and apparatus can be used for sintering and/or hot isostatic pressing of bodies made of ceramic powders and for similar purposes.

26 Claims, 1 Drawing Sheet

PROCESS AND APPARATUS FOR HEATING BODIES AT HIGH TEMPERATURE AND PRESSURE UTILIZING MICROWAVE ENERGY

This is a continuation of U.S. application Ser. No. 308,834, filed Feb. 9, 1989, now abandoned.

BACKGROUND OF THE INVENTION

I. Field of the Invention

This invention relates to processes and apparatus for heating bodies at high temperature and pressure. More particularly, the invention relates to such processes for heating bodies made of ceramics and the like utilizing microwave energy to bring about the desired heating.

II. Discussion of the Prior Art

Sintered shaped bodies are often formed by heating shaped pre-forms made of ceramic powders, e.g. alumina, to the required sintering temperature normally in the range of 1000°-2000° C. In conventional sintering, the pre-form to be sintered is brought up to the required temperature by placing it in a gas fired furnace or a furnace equipped with resistant heating elements. The product is heated by radiation and the thermal energy thus generated has to penetrate into the pre-form from the surface. In order to produce a crack-free product, the thermal stresses imposed by the internal temperature gradients have to be minimized. Mainly for this reason, but also in order to minimize thermal stresses within the furnace elements, the temperature of the product has to be increased slowly, and furnace cycle times of 24-48 hours are not uncommon. Because a significant amount of furnace insulation and wall mass is also heated up with the product, the thermal inertia of the system is quite large and rapid control of the temperature is not possible. Finally, element failure is quite common in high temperature electrical furnaces especially where temperature cycling occurs.

One way of improving the quality of sintered ceramic products is to use a hot isostatic press. In such a press, the product is introduced into a pressure vessel which is then sealed. Heating elements within the pressure vessel are energized and the product is heated. At the appropriate time, a gas at high pressure (typically 20,000 psi or higher) is introduced into the pressure vessel. The high pressure acts to compress the product uniformly in all directions and helps to correct any defects that may have formed during the heating. Thus, in general, hot isostatic pressing involves the following two stages:

(1) the pre-form is sintered until all open porosity is eliminated; and
(2) the pre-form is then subjected to high isostatic pressure.

Normally, for effective utilization of a hot isostatic press, sintering and hot pressing are done in two separate furnaces. As a result, the system is an expensive one and can be used only for extremely high value added products.

Sintering of ceramic powders by means of microwave heating is disclosed in Japanese Patent Publication 60-221367 dated Nov. 6, 1985 in the name of Nippon Microwave KK. This procedure involves placing ceramic powder in a ceramic receptacle located in a microwave cavity resonator or in a waveguide. Microwaves are guided into the resonator or waveguide while the powder is uniaxially pressed by means of a mechanical die or piston. However, uniaxial compression of this kind does not produce the desirable effects achieved by isostatic pressure.

SUMMARY OF THE INVENTION

The present invention is based on the finding that the use of microwaves as a heating source for hot isostatic pressing overcomes many of the problems of the conventional procedure and results in a more desirable product that is produced according to the Japanese patent publication mentioned above.

According to one aspect of the invention there is provided a process for subjecting a body to high temperature and pressure, which comprises: locating said body in a high pressure-resistant chamber capable of acting as a resonant cavity for microwave radiation of a predetermined frequency; irradiating said body in said chamber with microwave energy of about said predetermined frequency for a time sufficient to raise the temperature of the body to a suitable high temperature; and either subsequently or simultaneously raising the fluid pressure in said cavity to pressurize said body isostatically.

According to another aspect of the invention there is provided apparatus for subjecting a body to high temperature and pressure, which comprises: a high pressure-resistant chamber capable of acting as a resonant cavity for microwave radiation of a predetermined frequency; a magnetron capable of generating microwave radiation at about said predetermined frequency; guide means for guiding said microwave radiation into said chamber; and means for introducing a fluid at high pressure into said chamber.

An advantage of the present invention is that the heating and pressing steps can be carried out very rapidly and simply. Since the microwave energy heats the body directly and causes little heating of the apparatus, thermal masses are reduced, cycle times can be kept short and energy requirements are kept low.

Another advantage of the present invention over conventional hot isostatic pressing is that the atmosphere within the cavity during the heating and pressing steps can be varied widely without affecting the process and, if desired, the atmosphere can comprise a gas that reacts chemically with the body being treated. In conventional hot isostatic pressing using a cold wall reactor this is not usually possible because carbon electrodes are generally provided in the pressure chamber for heating the body and so a non-reactive atmosphere (especially a non-oxidizing atmosphere) is required to avoid degradation of the electrodes. In the present invention, there is no limitation on the reactivity of the atmosphere and this enables the process to be used with many new materials. For example, ceramic superconductors must be sintered in an oxidizing atmosphere or their superconductivity will be impaired. Alternatively, nitrogen atmospheres at high pressures can be used without high cost in the present invention when sintering such materials as silicon nitride, which tends to be decomposed to silicon when the conventional procedure is employed, but which sinters well under an atmosphere of high pressure nitrogen.

DETAILED DESCRIPTION OF THE INVENTION

Figure 1:
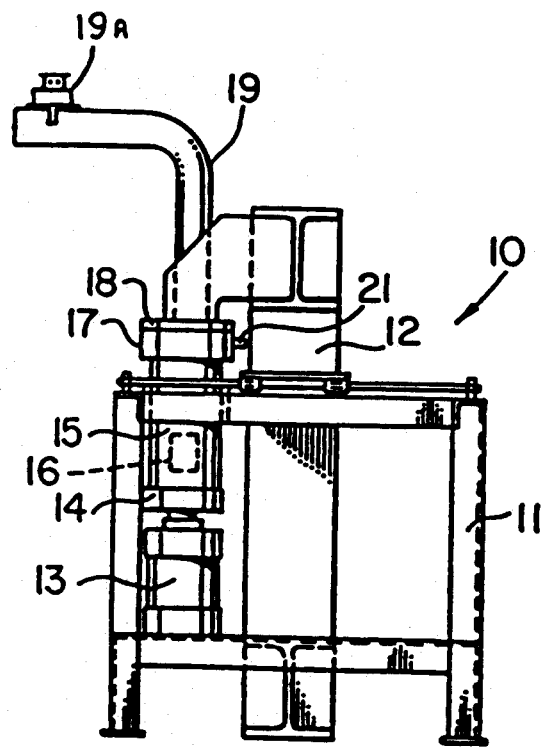
FIG. 1 is a side elevational view of a hot isostatic press according to one embodiment of the present invention, the press being in the heating position.

If, in the process of the invention, the heating and pressing steps are carried out together, provision must be made to introduce the microwaves into the pressurized cavity. This can be done by equipping the chamber with a high pressure resistant microwave transparent window or a solid microwave antenna passing through the vessel wall in a pressure tight arrangement. However, it is generally more economical to carry out the heating and pressing steps sequentially; for example, a wave guide can be introduced into an opening in the chamber during the heating step and then, for the pressing step, the waveguide can be removed and replaced by a high pressure resistant closure device.

The pressure inside the cavity can be elevated to the desired extent (usually 40,000–50,000 psi) during the pressing step by introducing a gas from a pressurized container or a high pressure pump. If the heating and pressing steps are to be carried out simultaneously, the cavity can be sealed during heating and the body subjected to autogenously-generated pressure.

The present invention can make use of conventional hot isostatic equipment modified for the generation, introduction and resonance of the microwave energy.

The pressure chamber, normally made of metal, should be designed as a single or multi-mode cavity resonator for a particular wavelength. The pressure chamber of a conventional press can be modified to achieve this, for example by inserting conducting cylinders of predetermined diameters into the chamber so that only the required cavity modes will resonate. As an example, at a frequency of 2.45 GHz, a cavity diameter of between 7.2 and 9.4 cm is required to excite the dominant mode in a cylindrical cavity. Depending on the shape of the pre-form body, other modes may have to be excited and this may be achieved by making the chamber larger. For extensive production runs involving the same pre-form configuration, the pressure vessel itself may be specifically designed to ensure resonance of the desired modes.

The body to be heated can be simply placed within the cavity or held within a container of microwave-transparent material (e.g. quartz).

Conventional magnetrons can be employed to generate the microwaves, e.g. magnetrons capable of generating microwaves at 2.45 GHz or 915 MHz at power levels of about 500–600 watts. Magnetrons of this type can generate sufficient heat within the body to raise the temperature rapidly to the sintering level e.g. up to about 2100° C. in as little as 5 to 10 minutes.

In a preferred form of the invention, the body is partially or fully submerged in a powder bed during the heating and pressurizing steps. The powder bed may have either one or both of the following functions. Firstly, when the body to be heated couples well with microwave energy, the bed may act as an insulator to reduce heat loss from the body as it is heated and, when the heating and pressing are carried out sequentially, during the period between the termination of the heating step and the completion of the pressing step. Secondly, the powder bed may contain or consist of a material that is susceptible to heating by the microwaves. This makes it possible to use the process of the invention with bodies made of materials that are either not heated by microwaves at all or are only poorly heated or which have a low loss factor. In such cases, instead of the body being heated directly by the microwaves, the susceptor bed is heated and the heat thus generated is conducted to the body submerged in the bed.

The powder material used for the bed should be capable of withstanding the high temperatures produced in the process without melting, sintering or decomposing. If the bed is to assist with the heating, the material should be susceptible to microwave heating at the frequencies employed. Ceramic powders are generally suitable, e.g. $BaTiO_3$ and other insulating ceramic oxides of high dielectric constant. In particular, $\beta$-alumina (which contains sodium compounds) is susceptible to microwave heating and is thus particularly preferred. Undesired sintering of the powder bed itself is generally not a problem because the bed is normally loosely packed, in contrast to the pre-form body in which the ceramic particles are tightly pressed together as a result of the initial shaping and pressing step normally carried out when producing pre-forms for sintering. The amount of powder bed employed is not critical but generally, because of the insulating effect, more powder bed means less power consumption.

To achieve special heating effects, the powder bed may be made non-homogeneous. For example, the bed may comprise at least two materials of different microwave susceptibilities with the proportions of the materials differing throughout the bed in order to produce different heating rates in different parts of the bed.

Figure 2:
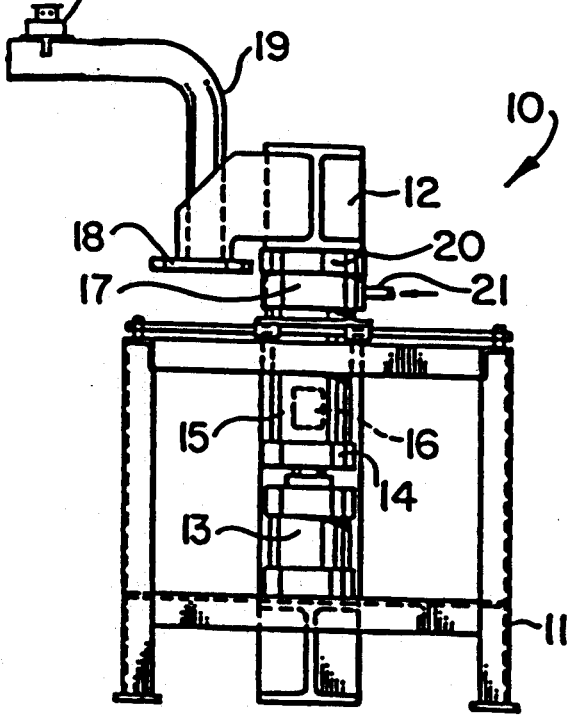
FIG. 2 is a view similar to FIG. 1, the press being in the pressing position.
Figure 3:
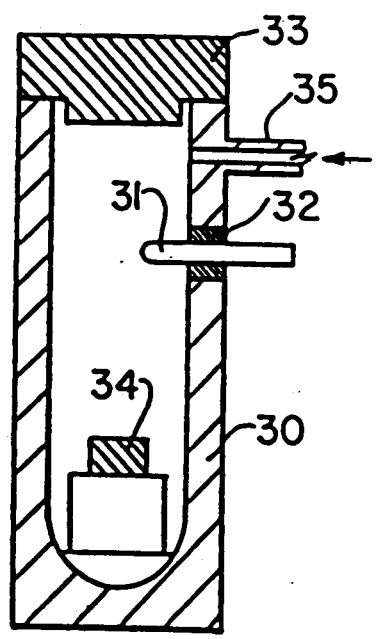
FIG. 3 is a resonant cavity, shown on an enlarged scale, suitable for simultaneous heating and pressing a product.

Preferred embodiments of the invention are described in the following with reference to the accompanying drawings, in which:

FIG. 1 is a side elevational view of a hot isostatic press according to one embodiment of the present invention, the press being in the heating position;

FIG. 2 is a view similar to FIG. 1, the press being in the pressing position; and FIG. 3 is a resonant cavity, shown on an enlarged scale, suitable for simultaneous heating and pressing a product.

A preferred example of a hot isostatic press according to the present invention is shown in FIGS. 1 and 2. The press 10 comprises an open rectangular framework 11 supporting a rigid "C-shaped" beam 12. A hydraulic ram 13 is supported by the lower framework members and is laterally slidable between the positions shown respectively in FIGS. 1 and 2. The piston 14 of the ram supports a pressure vessel 15, the interior of which forms a chamber designed to act as a resonant cavity for microwaves. The chamber contains a pre-form body 16 (shown in broken lines) to be treated, optionally supported in a powder bed (not shown). The upper end of the pressure vessel has an open collar 17. An engaging flange 18 is rigidly attached to the beam 12 at one side and has a central hole which receives a waveguide 19. The waveguide is connected to a magnetron 19A which generates microwaves of the desired frequency. These microwaves are conveyed by the waveguide in the direction of the arrow into the interior of the pressure vessel 17.

The equipment is used as follows. Firstly, the pre-form 16 is subjected to a heating cycle. For this, the apparatus is arranged in the manner shown in FIG. 1. The hydraulic ram 13 presses the pressure vessel 15 against the flange 18. The magnetron 19A is operated to direct microwave energy along the waveguide 19, through the collar 17 and into the chamber where the energy is absorbed by the body and/or the powder bed (if present) so that the temperature of the body rises rapidly. After a length of time suitable to raise the temperature of the body to the sintering range, the magnetron is switched off and the ram is lowered. A high pressure-sealing lid 20 is placed on the pressure vessel and the assembly moves to the right hand position as shown in FIG. 2 whereupon the ram is actuated to force the upper end of the pressure vessel and lid 20 against the upper end of the C-shaped beam 12 while the opposite end of the ram is braced against the lower end of the beam. Gas at high pressure is introduced into the pressure vessel through inlet 21. The pressurized gas introduced into the vessel during this part of the cycle may have a pressure as high as 20,000 psi or more. The pressure has the same effect on the ceramic product as in conventional hot isostatic pressing. The body is maintained at a suitable temperature during this step by virtue of the powder bed (if present) in which it is embedded and by virtue of its own thermal mass.

After the pressurizing step is complete, the pressure in the pressure vessel is relieved and the product is allowed to cool down whereupon it may be removed from the pressure vessel and powder insulation bed.

Although not shown in FIGS. 1 and 2, the apparatus may comprise two or more presses of the illustrated design, each being connected to a single magnetron via their waveguides 19. Switching means are provided in the waveguides so that microwave energy may be conveyed to only one of the presses at a time. In this way, when the microwave energy is no longer required for one press (i.e. during the pressing or cooling cycles), it can be switched to the other (or one of the other) presses. The capital costs can thereby be reduced and productivity increased.

FIG. 3 shows an alternative pressure vessel 30. As in the previous embodiment, the interior of the pressure vessel forms a chamber which acts as a resonant cavity. In this case, the microwave radiation is introduced into the resonant cavity by means of an antenna 31 which extends into the cavity through a high pressure seal 32. A pressure head 33 completes the sealing of the cavity and a pressurized gas is introduced through inlet 35. Because this equipment is capable of both pressurizing and irradiating a sample 34 at the same time, if desired, there is no need to separate the heating step and the pressurizing step as in the previous embodiment and both can be carried out with the press in the position shown in FIG. 2, i.e. with the pressure vessel clamped between the ram and the C-shaped beam.

Although not shown in the drawings, alternative apparatus may comprise a chamber sealed by a lid having a microwave-transparent window and a high pressure shutter behind the window to protect the window from the high pressure in the chamber during the pressing cycle. Using this arrangement, microwaves can be introduced through the window during the heating cycle and then, after closure of the shutter, pressurized gas may be introduced into the chamber for the pressing cycle. Using such an apparatus, it may not be necessary to move the vessel between two different stations for the heating and pressing steps. In the case of microwave energy at 2.45 GHz up to 5 kw, the window may be made of quartz and should have an area of approximately 2×2 inches.

While preferred embodiments of the invention have been described in detail above, various alterations and modifications will occur to persons skilled in the art. All such alterations and modifications are included within the scope of the present invention as defined by the following claims.

What we claim is:

1. A process of sintering and isostatically compressing a body comprising particles of a sinterable material, which process comprises:
   locating said body in a vessel acting as a resonant cavity for microwave radiation of a predetermined frequency, said vessel being able to withstand an internal pressure of at least 20,000 psi at a temperature effective for sintering said particles of sinterable material;
   irradiating said body in said vessel with microwave energy of about said predetermined frequency for a time sufficient to raise the temperature of the body to said temperature effective for sintering said particles of sinterable material; and
   raising pressure in said vessel to said pressure of at least 20,000 psi to pressurize said body isostatically.

2. A process according to claim 1 wherein said body is surrounded by a bed of a heat-resistant powder capable of acting as a heat insulator for said body.

3. A process according to claim 1 wherein said body is surrounded by a bed of a powder which is susceptible to heating by microwaves.

4. A process according to claim 1, wherein the irradiating and pressurizing steps are carried out sequentially.

5. A process according to claim 1, wherein the irradiating and pressurizing steps are carried out simultaneously.

6. A process according to claim 1, wherein the pressure in the vessel is raised by introducing a pressurized gas into the vessel from an external source.

7. A process according to claim 1, wherein the pressure in the vessel is raised by sealing the vessel during the irradiating step so that the pressure in the chamber rises autogenously as the temperature increases.

8. A process according to claim 1, wherein an atmosphere present in the vessel during said irradiating and/or pressurizing steps is reactive with material forming said body.

9. A process according to claim 1, wherein the microwave energy is introduced into said vessel via a waveguide and an opening in the vessel.

10. A process according to claim 1, wherein the microwave energy is introduced into said vessel via a solid antenna located in a wall of the vessel.

11. A process according to claim 1, wherein the microwave energy is introduced into said vessel via a microwave-transparent window in a wall of the vessel.

12. A process according to claim 1, wherein the microwave energy has a frequency of about 2.45 GHz.

13. A process according to claim 1, wherein the microwave energy has a power of about 500–600 watts.

14. A process according to claim 1, wherein the body is surrounded by a powder bed comprising at least two materials of different microwave susceptibilities, and wherein the proportion of the materials differs throughout the bed in order to produce different heating rates in different parts of the bed.

15. A process according to claim 1, wherein the pressure in said vessel is raised to about 40,000–50,000 psi.

16. Apparatus for sintering and isostatically compressing a body comprising particles of a sinterable material, which apparatus comprises:
   a vessel able to withstand an internal pressure of at least 20,000 psi forming a resonant cavity for microwave radiation of a predetermined frequency;
   a magnetron for generating microwave radiation at about said predetermined frequency;
   guide means for guiding said microwave radiation from said magnetron into said vessel; and
   means for raising the internal pressure of said vessel to at least 20,000 psi;
   whereby said body can be positioned within said vessel and irradiated with said microwaves guided into said vessel from said magnetron to raise the temperature of said body to a temperature effective for sintering said particles of sinterable material, and said body can be subjected isostatically to a pressure of at least 20,000 psi.

17. Apparatus according to claim 16, wherein the vessel can be sealed so that autogenous pressure is generated when said body located in the vessel is heated.

18. Apparatus according to claim 17, wherein vessel is movable between first and second positions, and wherein said guide means are located at said first position and a clamp is located at said second position for clamping a removable closure firmly to said vessel.

19. Apparatus according to claim 16, wherein said vessel receives a microwave-transparent container for holding said body and a powder bed within which said body can be immersed.

20. Apparatus according to claim 16, further including at least one conductive cylinder in said vessel for varying the microwave resonance of said vessel.

21. Apparatus claim 16, wherein said magnetron generates microwaves having a frequency of about 2.45 GHz at a power of about 500–600 watts.

22. Apparatus according to claim 16, wherein said guide means comprises a solid antenna passing through a wall of said vessel.

23. Apparatus according to claim 16, wherein said guide means comprises a waveguide opening into said vessel.

24. Apparatus according to claim 16, wherein said vessel has an opening sealed by a microwave transparent window.

25. Apparatus according to claim 24 further comprising a high pressure shutter for isolating said window from high pressure within the vessel.

26. Apparatus according to claim 16, further comprising a plurality of said high pressure resistant vessels, a plurality of guide means for guiding microwave energy from said magnetron to each of said vessels and switching means for directing said microwave energy to only one of said vessels at a time.

* * * * *